United States Patent [19]

Nakao et al.

[11] Patent Number: 4,954,122
[45] Date of Patent: Sep. 4, 1990

[54] DIFFERENTIAL GEAR APPARATUS WITH WORM GEARS

[75] Inventors: Toshiyuki Nakao; Naomichi Adachi, both of Chiryu, Japan

[73] Assignee: Aisin Seiki Kabushiki Kaisha, Kariya, Japan

[21] Appl. No.: 329,676

[22] Filed: Mar. 28, 1989

[30] Foreign Application Priority Data

Mar. 31, 1988 [JP] Japan .................. 63-042110

[51] Int. Cl.$^5$ ............................ F16H 1/38
[52] U.S. Cl. ............................ 475/160; 475/227
[58] Field of Search .......... 74/715, 710, 467, 714, 74/607, 724; 184/6.12

[56] References Cited

U.S. PATENT DOCUMENTS

| | | | |
|---|---|---|---|
| 2,908,351 | 10/1959 | Daley, Jr. ................. | 184/6.12 |
| 3,182,527 | 5/1965 | Bryan ....................... | 74/467 X |
| 3,441,106 | 4/1969 | Taylor et al. ............. | 74/607 X |
| 3,515,246 | 6/1970 | Haight et al. ............. | 74/467 X |
| 3,741,343 | 6/1973 | Lindenfeld et al. ...... | 184/6.12 X |
| 3,838,751 | 10/1974 | Brown ..................... | 184/6.12 |
| 4,018,097 | 4/1977 | Ross ......................... | 74/467 |
| 4,191,071 | 3/1980 | Gleasman et al. ....... | 74/715 |
| 4,319,499 | 3/1982 | Sanui et al. .............. | 74/467 X |
| 4,586,395 | 5/1986 | Fukuchi et al. .......... | 74/710 X |
| 4,751,853 | 6/1988 | Dissett ..................... | 74/715 |

FOREIGN PATENT DOCUMENTS

| | | | |
|---|---|---|---|
| 58-170631 | 10/1983 | Japan ....................... | 74/467 |
| 59-208268 | 11/1984 | Japan ....................... | 74/467 |
| 2192957 | 1/1988 | United Kingdom ...... | 74/467 |

Primary Examiner—Dirk Wright
Attorney, Agent, or Firm—Burns, Doane, Swecker & Mathis

[57] ABSTRACT

A differential gear apparatus includes a housing for rotation about a predetermined axis under the power of an external power source, and a lubricating oil reservoir and worm gear arrangement mounted in the housing for rotation. A lubricating arrangement is disposed with respect to the housing for guiding the lubricating oil from the lubricating oil reservoir to the work gears against centrifugal force created by rotation of the housing.

2 Claims, 4 Drawing Sheets

DIFFERENTIAL GEAR APPARATUS WITH WORM GEARS

FIELD OF THE INVENTION

This invention relates to a lubricant apparatus for a differential gear device of the worm gear type. More specifically, a lubricant apparatus of a differential-limiting type differential gear having worm gears.

DESCRIPTION OF THE RELATED ART

A differential gear apparatus for operating two axle shafts when a difference occurs between the rotating speeds of wheels attached to each axle shaft utilizes a reduction gear apparatus, so that the apparatus prevents slipping of the wheel and stabilizes control of the car. In a conventional differential apparatus, two axle shafts transmit the equivalent torque through two small differential gears. When the resistance of one of the axle shafts is reduced, the other of the axle shafts cannot simultaneously transmit the torque. Consequently, a vehicle equipped with such a differential cannot move. In order to overcome this defect, a frictional resistance arrangement in the differential limiting apparatus recovers the torque being transmitted through the mechanism. A differential gear apparatus with worm gears is one type of frictional differential limiting apparatus. The meshing surface between a worm gear and a worm wheel has a larger contact area than other gears, because the teeth of the worm gear intrude between the teeth of the worm wheel in wedge-like fashion, when the worm gear rotates. The differential gear apparatus with worm gears creates frictional torque through the sliding contact between the tooth-faces of the worm gear and the worm wheel and transmits the driving force by meshed gears.

However, a larger slip causes a greater frictional loss and more wear. When the tooth face wears out, the friction of the initial differential limiting is reduced and, in the worst case, may be eliminated. Also, foreign substance and residue of the tooth may lodge in the rotating members, causing damage or breakage. In the conventional differential gear apparatus with worm gears, the amount of lubricant oil to reduce wear may be depleted at times, because the lubricant oil disperses radially outwardly as the worm wheels rotate around the worm gear. It is difficult to supply oil to the center portion of the worm gear, namely, the engaging part of the worm gear.

SUMMARY OF THE INVENTION

It is an objection of the invention to provide a lubricant apparatus for a differential gear device which supplies a sufficient amount of lubricating oil to the engaging part of the worm gears and the worm wheels.

It is another object of the invention to provide a differential gear apparatus which reduces wear of the teeth of the worm gears and the worm wheels.

It is another object of the invention to increase the useful life of a differential gear apparatus.

It is another object of the invention to better distribute lubricating oil in a differential gear apparatus.

In order to accomplish the foregoing and other objects, the differential gear apparatus with worm gears includes a lubricant apparatus which has an oil receiving part fixed to the casing and set radially outside of the worm wheels about the axle-line of the vehicle. The oil receiving part has an oil receiving face extending along an axle of the worm wheel about the turning direction of the worm wheel, extending along a range in which the oil receiving face covers first and second worm wheels of the differential.

Further, the differential gear apparatus includes an attaching part of the oil-receiving part which forms a washer between the casing and worm wheels or which forms a washer in which bolts fix the ring gear to the casing.

DETAILED DESCRIPTION OF THE PREFERRED EMBODIMENTS

Figure 1:
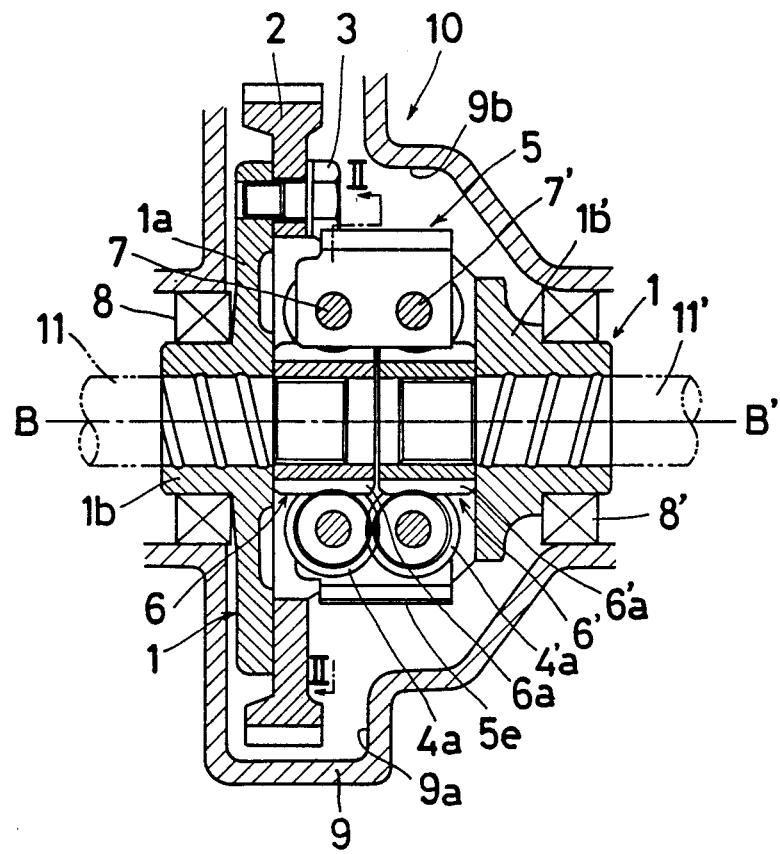
FIG. 1 shows a front section view of the differential apparatus of the taken along the line I—I in FIG. 2.
Figure 2:
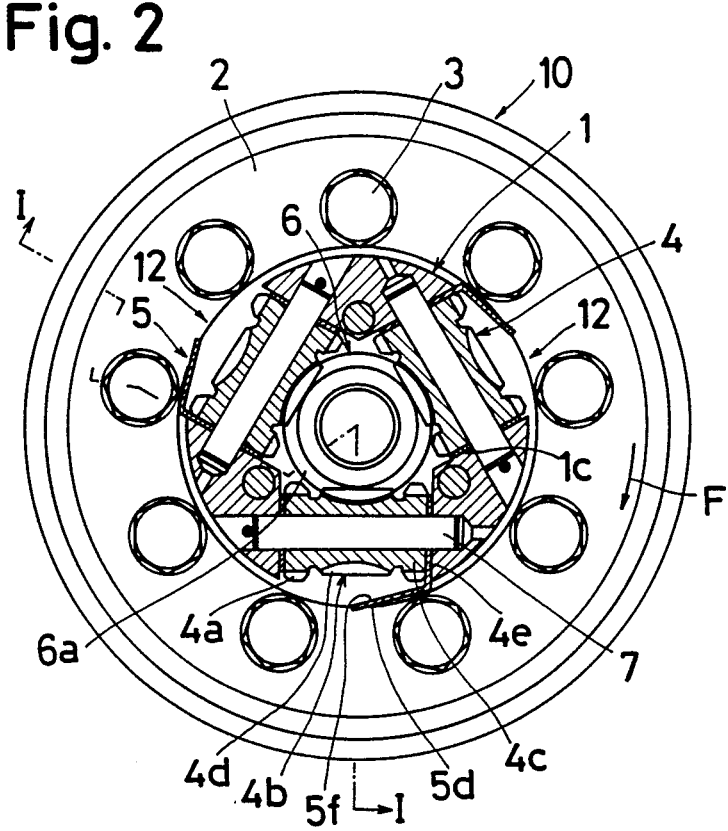
FIG. 2 shows a front view of the differential apparatus of the invention.
Figure 3:
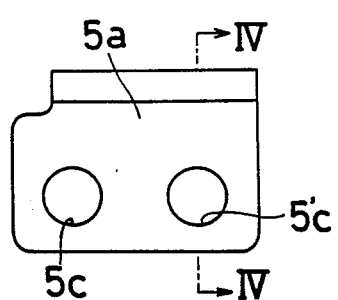
FIG. 3 shows a front view of the lubricant apparatus of the invention.
Figure 4:
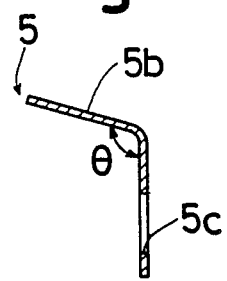
FIG. 4 shows a sectional view of the lubricant apparatus taken along the line IV—IV in FIG. 3.
Figure 5:
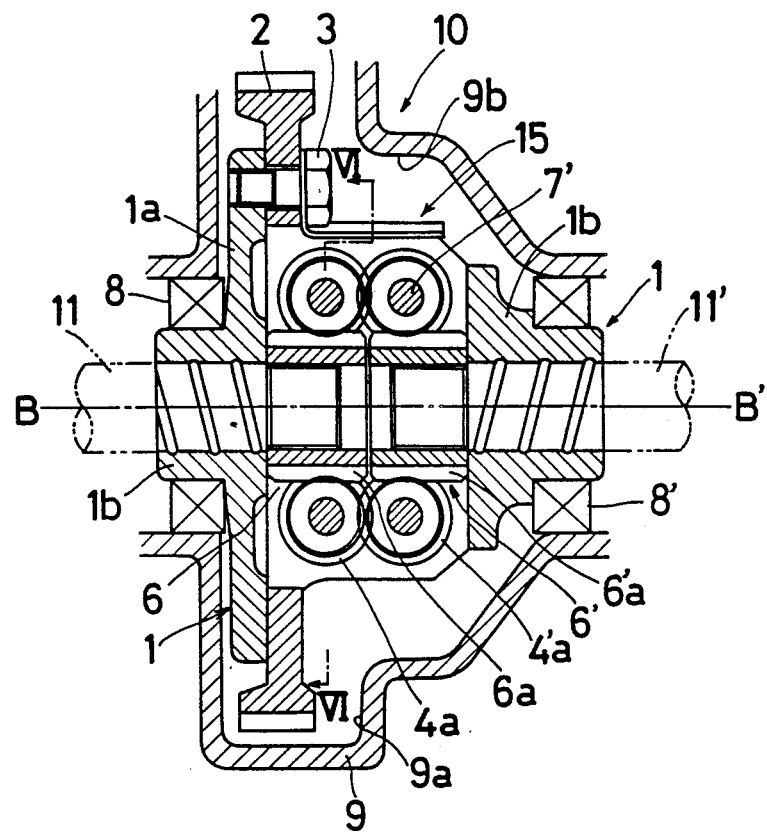
FIG. 5 shows a sectional view of another embodiment of the differential apparatus of the invention taken along the line V—V in FIG. 6.
Figure 6:
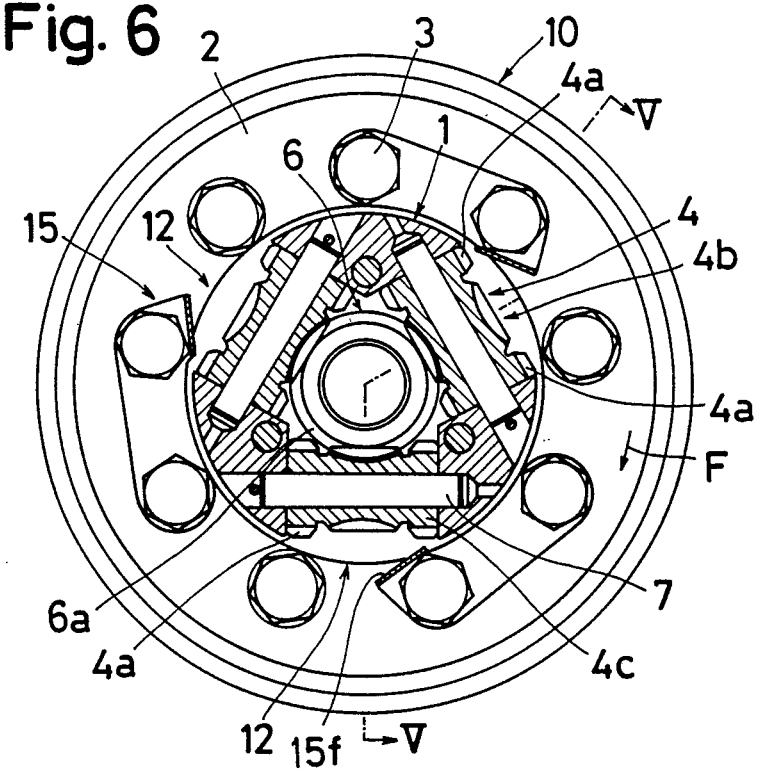
FIG. 6 shows a front view of the embodiment of FIG. 5.
Figure 7:
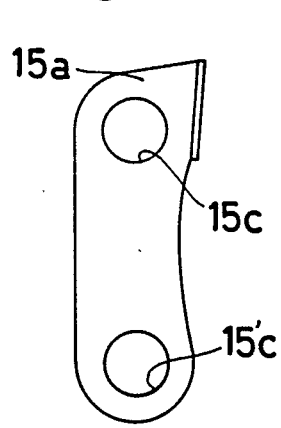
FIG. 7 shows a front view of another embodiment of the lubricant apparatus of the invention used in the differential apparatus of FIG. 6.
Figure 8:
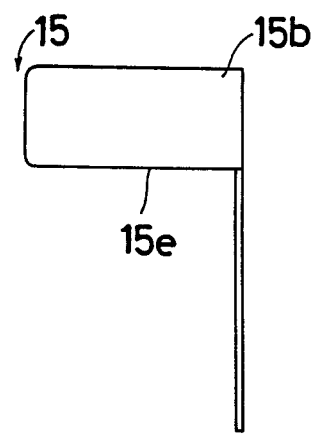
FIG. 8 shows a side view of the lubricant apparatus of FIG. 7.

Referring now to FIG. 1, each of two axle shafts 11,11" (shown as a dot chain line) is connected to each of two worm gears 6,6" with splines (not shown), and are positioned along a central axle line B—B" and rotationally supported by each of two bosses 1b, 1b". Two groups of three worm wheels 4,4" are each engaged to the worm gears 6,6" so that each of the groups form a regular triangle (only the worm wheels 4 being shown in FIG. 2). The worm wheels 4,4" being engaged to each of the worm gears 6,6" so that each of the groups form a regular triangle. The worm wheels 4,4" are parallel to each other along the axle line B—B", so that they face each other. Each of the worm wheels 4,4" are rotationally supported to each of two shafts 7,7" fixed to the differential case 1. Spur gears 4a,4a" are integrally formed on the ends of each of the worm wheels 4,4" and each of the spur gears 4a is engaged with each of the corresponding spur gears 4a". A ring gear 2 is fixed to a flange 1a of the case 1 by a fastening arrangement 3, and is engaged with a driving gear (not shown).

Bearings 8,8" fit on the radially outer side of the bosses 1b, 1b" formed at both ends of the case 1, and the case 1 is rotationally supported on a housing 9 by the bearings 8,8".

The driving power of the driving gear is transmitted to the case 1 through the ring gear 2. Rotation of the case 1 is transmitted to the worm wheels 4,4" which rotate around the worm gears 6,6". The rotations of the worm wheels 4,4" make the worm gears 6,6" rotate. The rotation of the worm gears 6,6" may be transmitted to the driving wheels (not shown) of a vehicle through the axle shafts 11,11".

When no difference exists in the speed of rotation of the axle shafts 11,11" the case 1, the worm wheels 4,4" and the worm gears 6,6" rotate as one body.

When a vehicle rounds a curve, a difference in the speed of rotation of the axle shafts occur and is transmitted to the worm wheels 4,4" which are synchronized with each other through the spur gears 4a,4a" formed thereon. Therefore the rotation of one of the worm gears slows down, the other increases and they are operated differentially.

A lubricant apparatus 5 is disposed in the differential apparatus 10. The lubricant apparatus 5 has a bent portion which comprises a fixture part 5a and an oil receiving part 5b. The fixture part 5a constitutes a washer and the oil receive part 5b is formed integrally with the washer. The fixture part 5a has holes 5c 5c" through which the shafts 7,7" pass. The fixture part 5a is positioned between a side face 4e of the worm wheel 4,4" and a side face 1c of the case. so that it is fixed in the direction of the axle line of the worm wheel, and the fixture part 5a is fixed in the radial direction of the worm wheel through the shafts 7,7". The fixture part 5a functions as a thrust washer. The receiving part 5b forms a rectangle, at an obtuse angle $\theta$ with respect to the fixture part 5a, and is at an oblique angle with respect to the axle line B—B". The receiving part 5b extends along the axle line of the worm wheel about the turning direction F so that it covers a portion of the worm wheel, and an opening 12 provided along a section of the differential not covered by the receiving part 5b. A long side 5e extends along the direction of the axle line B—B", so that it covers the worm wheel 6. An inner side face 5f extends to the end 4c of the worm wheel through the fixture part 5a.

Oil which stays in the bottom 9a of the housing 9 is scooped up by the ring gear 2, scattered radially by centrifugal force and attaches to the inner wall 9b of the housing 9. Some of the oil attached to the inner wall falls and adheres to the worm wheels 4,4" through the opening 12. The oil adhering to the worm wheel is radially dispersed by the centrifugal force and is received by the receiving part 5b. The oil moves due to the centrifugal force to the inner side face 5f corresponding to a change of the rotational speed of the oil receiving part 5b, and is transferred to the end 4c of the worm wheel which is continuously connected to the inner side face 5f through the fixture part 5a. Further the oil lubricates the tooth face 6a of the worm gear and the tooth face 4d of the worm wheel so that the oil reduces wear of the tooth faces.

FIGS. 5 to 8 show another embodiment of the present invention. In comparison with the embodiment of FIGS. 1 to 4, the lubricant apparatus 15 is different while the differential apparatus 10 is the same. The lubricant apparatus 15 has a bent portion which comprises a fixture part 15a and an oil receiving part 15b. The fixture part 15a constitutes a washer. The oil receiving part 15b is formed perpendicularly to the washer. Two holes 15c,15c" are bored in the fixture part 15a. The bolts 3 pass through the holes 15c,15c" and the lubricant apparatus 15 is fixed to the case 1 through the ring gear 2 by the bolts 3. The sides of the oil receiving part 15b, function the same as the embodiment of FIGS. 1 to 4. The oil receiving part 15b is disposed so that the inner side face 15f faces toward the worm wheel 4. Namely, so that the extending face of the inner side face 15f communicates with the end 4c of the worm wheel 4, the oil receiving part 15b has a predetermined angle to the axle line of the worm wheel radially outside of the worm wheel. The oil on the inner side face 15f moves on the face corresponding to changes of the rotational speed of the oil receiving part 15b, and is transferred to the end 4c of the worm wheel so that the oil lubricates the engaging parts in the same manner as that of the previous embodiment.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A differential gear apparatus, comprising:
    a power source;
    housing means for rotation about a predetermined axis when driven by said power source and including a lubricating oil reservoir;
    worm gear means including first and second worm gears mounted in the housing means for rotation therein; and
    an enlarged washer member disposed between the housing means and said worm gear means for guiding lubricating oil from the lubricating oil reservoir to the first and second worm gears against centrifugal force created by rotation of said housing means.

2. A differential gear apparatus of claim 1 wherein said housing means includes a ring gear connected to the power source, a housing member fixed to the ring gear for supporting the worm gear means, said enlarged washer member disposed between the ring gear and the housing member.

* * * * *